(12) United States Patent
Akashika et al.

(10) Patent No.: US 8,601,527 B2
(45) Date of Patent: Dec. 3, 2013

(54) WIRELESS COMMUNICATION DEVICE, INFORMATION PROCESSING DEVICE, WIRELESS COMMUNICATION METHOD, AND INFORMATION PROCESSING SYSTEM

(75) Inventors: Hideki Akashika, Tokyo (JP); Takashi Tsurumoto, Saitama (JP); Kanahiro Shirota, Kanagawa (JP)

(73) Assignee: Sony Corporation (JP)

( * ) Notice: Subject to any disclaimer, the term of this patent is extended or adjusted under 35 U.S.C. 154(b) by 177 days.

(21) Appl. No.: 13/201,944

(22) PCT Filed: Feb. 19, 2010

(86) PCT No.: PCT/JP2010/052492
§ 371 (c)(1),
(2), (4) Date: Aug. 17, 2011

(87) PCT Pub. No.: WO2010/098253
PCT Pub. Date: Sep. 2, 2010

(65) Prior Publication Data
US 2011/0298991 A1    Dec. 8, 2011

(30) Foreign Application Priority Data
Feb. 27, 2009   (JP) ................................ P2009-047230

(51) Int. Cl.
*H04N 7/173*   (2011.01)

(52) U.S. Cl.
USPC ............................ 725/133; 725/141; 725/153

(58) Field of Classification Search
USPC ............. 725/133, 141, 153, 62; 348/730, 734
See application file for complete search history.

(56) References Cited

U.S. PATENT DOCUMENTS

2002/0043557 A1   4/2002  Mizoguchi et al.
2004/0148632 A1*  7/2004  Park et al. ...................... 725/81

FOREIGN PATENT DOCUMENTS

| JP | 2001-126000 A | 5/2001 |
| JP | 2002-027576 A | 1/2002 |
| JP | 2002-109441 A | 4/2002 |
| JP | 2002-271703 A | 9/2002 |
| JP | 2007-304870 A | 11/2007 |

* cited by examiner

*Primary Examiner* — Hunter B Lonsberry
(74) *Attorney, Agent, or Firm* — Lerner, David, Littenberg, Krumholz & Mentlik, LLP

(57) ABSTRACT

The wireless communication device includes a terminal communication transition unit for sending a transition instruction for transitioning to a state in which communication with a communication terminal is possible, a terminal communication unit that transitions to a state in which the communication with the communication terminal is possible in response to the transition instruction sent by the terminal communication transition unit, a signal generating unit for generating a transition instruction signal corresponding to the transition instruction, a transmission unit for wirelessly transmitting the transition instruction signal generated by the signal generating unit to an information processing device, a reception unit for wirelessly receiving a response from the information processing device to the transition instruction signal transmitted from the transmission unit, and a terminal communication control unit for starting to control information transmission/reception between the communication terminal and the information processing device according to the response received by the reception unit.

10 Claims, 9 Drawing Sheets

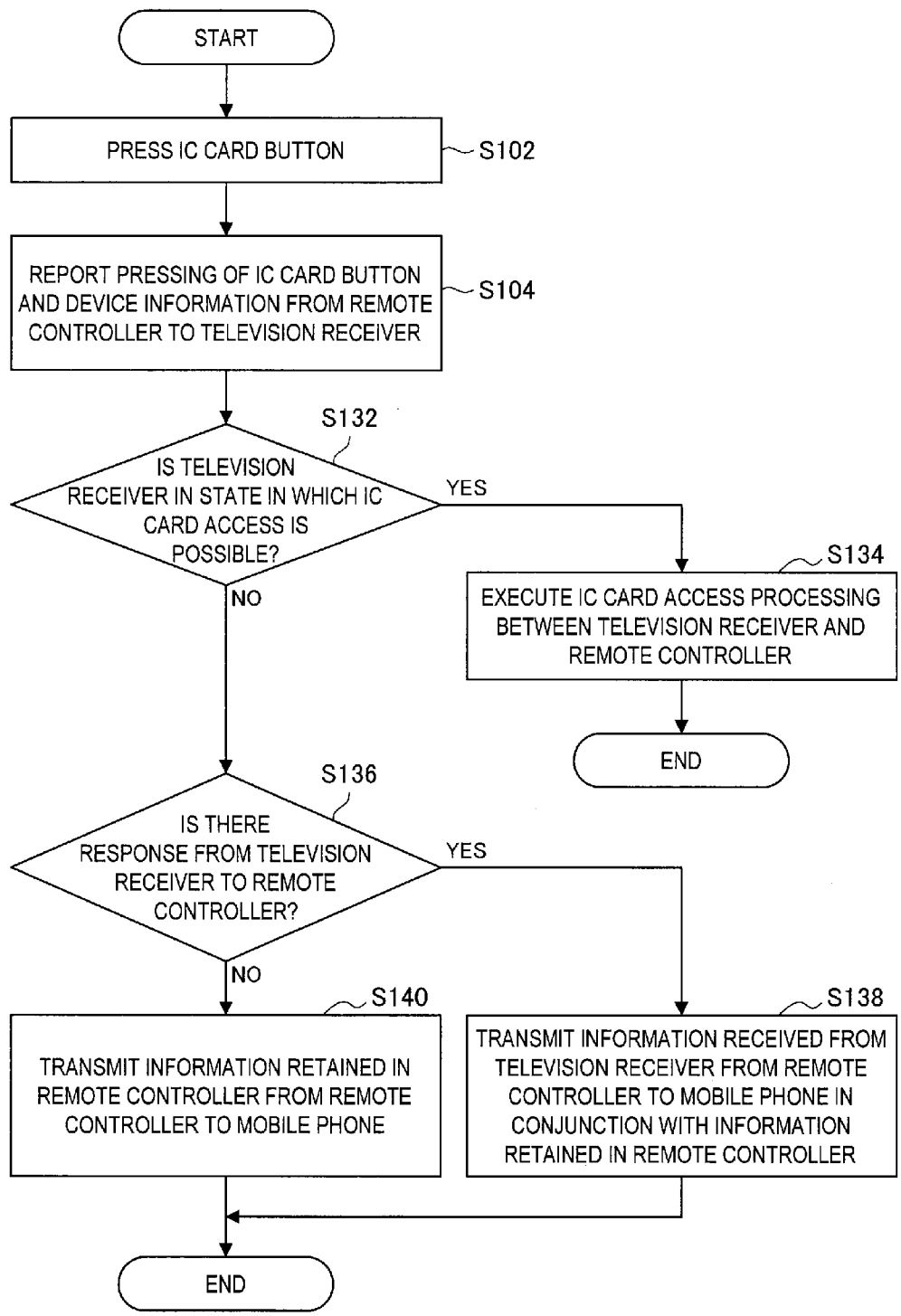

WIRELESS COMMUNICATION DEVICE, INFORMATION PROCESSING DEVICE, WIRELESS COMMUNICATION METHOD, AND INFORMATION PROCESSING SYSTEM

CROSS-REFERENCES TO RELATED APPLICATIONS

The present application is a national phase entry under 35 U.S.C. §371 of International Application No. PCT/JP2010/052492 filed Feb. 19, 2010, published on Sep. 2, 2010 as WO 2010/098253 A1, which claims priority from Japanese Patent Application No. JP 2009-047230 filed in the Japanese Patent Office on Feb. 27, 2009.

TECHNICAL FIELD

The present invention relates to a wireless communication device, an information processing device, a wireless communication method, and an information processing system.

BACKGROUND ART

Information processing systems, which provide services such as payment, discount services, and point services by establishing a wired connection to a reader/writer that reads/writes from/to a terminal (for example, an integrated circuit (IC) card, a mobile phone, or the like) having a built-in IC chip capable of contact communication or non-contact communication with an information processing device such as a personal computer, a home appliance, or a point of sale (POS) register, have come into wide use. Likewise, the provision of payment or various services is widely performed by exchanging information between the above-described information processing device connected to the reader/writer and a server connected by a network.

The above-described information processing system may be used by connecting the reader/writer to the above-described information processing device in a wireless connection, not a wired connection. For example, the reader/writer, which reads/writes from/to the terminal having the built-in IC chip, may be embedded in a keyboard wirelessly connected to a main body of a personal computer.

CITATION LIST

Patent Literature

Patent Literature 1: JP 2002-271703

SUMMARY OF INVENTION

Technical Problem

In wirelessly connected devices of the related art, electric power is usually supplied by a rechargeable battery and its power duration is usually comparatively long. However, electric power may be supplied by a battery according to a device. Accordingly, if the reader/writer is embedded in the device to which the electric power is supplied by the battery, there is a problem in that battery consumption is fast when the electric power is constantly continuously supplied to the reader/writer. If the reader/writer is embedded in the device to which the electric power is supplied by the battery as described above, it is necessary to provide a mechanism for starting the reader/writer from another device so as to suppress the speed of battery consumption.

The present invention has been made in view of the above-described problem, and an object of the invention is to provide a novel and improved wireless communication device, information processing device, wireless communication method, and information processing system that can suppress power consumption by starting a function of a reader/writer in response to an instruction of a user to a wirelessly connected device and transmit information from the reader/writer according to a situation of a device of a wireless communication destination.

Solution to Problem

According to an aspect of the present invention in order to achieve the above-mentioned object, there is provided a wireless communication device including: a manipulation unit including a terminal communication transition unit for sending a transition instruction for transitioning to a state in which communication with a communication terminal that performs contact communication or non-contact communication is possible; a terminal communication unit that transitions to a state in which the contact communication or the non-contact communication with the communication terminal is possible in response to the transition instruction sent by the terminal communication transition unit; a signal generating unit for generating a signal corresponding to a manipulation of the manipulation unit including a transition instruction signal corresponding to the transition instruction; a transmission unit for wirelessly transmitting the transition instruction signal generated by the signal generating unit to an information processing device; a reception unit for wirelessly receiving a response from the information processing device to the transition instruction signal transmitted from the transmission unit; and a terminal communication control unit for starting to control information transmission/reception between the communication terminal and the information processing device only if the response received by the reception unit indicates that the information processing device is in a state in which information transmission/reception to/from the communication terminal is possible and there is no other communication terminal that transmits/receives information.

According to this configuration, the manipulation unit includes the terminal communication transition unit for sending the transition instruction for transitioning to the state in which the communication with the communication terminal that performs the contact communication or the non-contact communication is possible, and the terminal communication unit transitions to the state in which the contact communication or the non-contact communication is possible by the transition instruction sent by the terminal communication transition unit. The signal generating unit generates the signal corresponding to the manipulation of the manipulation unit including the transition instruction signal corresponding to the transition instruction, the transmission unit wirelessly transmits the transition instruction signal generated by the signal generating unit to the information processing device, and the reception unit wirelessly receives the response from the information processing device to the transition instruction signal transmitted from the transmission unit. The terminal communication control unit starts to control the information transmission/reception between the communication terminal and the information processing device only if the response received by the reception unit indicates that the information processing device is in the state in which the information transmission/reception to/from the communication terminal is possible and there is no other communication terminal that transmits/receives the information. As a result, it is possible to suppress power consumption by starting a function of a reader/writer in response to an instruction of a user to a wirelessly connected device and start information transmission/reception between a communication terminal that performs the contact communication or the non-contact communication and an information processing device of a wireless communication destination according to a situation of the information processing device of the wireless communication destination.

The signal generating unit may limit signal generation when the manipulation unit is manipulated if information is transmitted/received between the communication terminal and the information processing device.

If the manipulation unit is manipulated for a manipulation that does not affect the contact communication or the non-contact communication between the terminal communication unit and the communication terminal, the signal generating unit may generate a signal corresponding to the manipulation.

The terminal communication control unit may control the terminal communication unit to transmit information unique to the wireless communication device to the communication terminal when sensing that the information processing device is not in the state in which the information transmission/reception to/from the communication terminal is possible.

The terminal communication control unit may control the terminal communication unit to transmit information unique to the wireless communication device and information regarding an operation situation of the information processing device to the communication terminal if the response received by the reception unit indicates that the information processing device is in the state in which the information transmission/reception to/from the communication terminal is possible, but there is another communication terminal that transmits/receives information.

The information regarding the operation situation may be information regarding a program being watched.

If the manipulation unit is manipulated for a manipulation that does not affect the contact communication or the non-contact communication between the terminal communication unit and the communication terminal, the signal generating unit may generate a signal corresponding to the manipulation.

According to another aspect of the present invention in order to achieve the above-mentioned object, there is provided an information processing device including: a reception unit for receiving a signal wirelessly transmitted from a wireless terminal; a signal analyzing unit for analyzing whether or not a transition instruction for transitioning to a state in which communication from the wireless terminal to a communication terminal that performs contact communication or non-contact communication is possible is included in the signal received by the reception unit; and a response generating unit for generating a response to the transition instruction when communication processing for the communication terminal is possible and there is no other communication terminal that transmits/receives information if the transition instruction is included as an analysis result of the signal analyzing unit.

According to another aspect of the present invention in order to achieve the above-mentioned object, there is provided a wireless communication method including: a sending step of sending a transition instruction for transitioning to a state in which communication with a communication terminal that performs contact communication or non-contact communication is possible; a transition step of transitioning to a state in which the contact communication or the non-contact communication with the communication terminal is possible by the transition instruction sent in the sending step; a signal generating step of generating a transition instruction signal corresponding to the transition instruction; a transmission step of wirelessly transmitting the transition instruction signal generated in the signal generating step to an information processing device; a reception step of wirelessly receiving a response from the information processing device to the transition instruction signal transmitted in the transmission step; and a control step of starting to control information transmission/reception between the communication terminal and the information processing device only if the response received in the reception step indicates that the information processing device is in a state in which information transmission/reception to/from the communication terminal is possible and there is no other communication terminal that transmits/receives information.

According to another aspect of the present invention in order to achieve the above-mentioned object, there is provided an information processing system including: a wireless communication device for wirelessly transmitting/receiving a signal; and an information processing device for wirelessly transmitting/receiving a signal to/from the wireless communication device, wherein the wireless communication device: includes a manipulation unit including a terminal communication transition unit for sending a transition instruction for transitioning to a state in which communication with a communication terminal that performs contact communication or non-contact communication is possible; a terminal communication unit that transitions to a state in which the contact communication or the non-contact communication with the communication terminal is possible in response to the transition instruction sent by the terminal communication transition unit; a signal generating unit for generating a signal corresponding to a manipulation of the manipulation unit including a transition instruction signal corresponding to the transition instruction; a transmission unit for wirelessly transmitting the transition instruction signal generated by the signal generating unit to the information processing device; a reception unit for wirelessly receiving a response from the information processing device to the transition instruction signal transmitted from the transmission unit; and a terminal communication control unit for starting to control information transmission/reception between the communication terminal and the information processing device only if the response received by the reception unit indicates that the information processing device is in a state in which information transmission/reception to/from the communication terminal is possible and there is no other communication terminal that transmits/receives information, and the information processing device includes: a reception unit for receiving a signal wirelessly transmitted from a wireless terminal; a signal analyzing unit for analyzing whether or not a transition instruction for transitioning to a state in which communication from the wireless terminal to a communication terminal that performs the contact communication or the non-contact communication is possible is included in the signal received by the reception unit; and a response generating unit for generating a response to the transition instruction when communication processing for the communication terminal is possible and there is no other communication terminal that transmits/receives information if the transition instruction is included as an analysis result of the signal analyzing unit.

Advantageous Effects of Invention

According to the present invention as described above, it is possible to provide a novel and improved wireless communication device, information processing device, wireless communication method, and information processing system that can suppress power consumption by starting a function of a reader/writer in response to an instruction of a user to a wirelessly connected device and transmit information from the reader/writer according to a situation of a device of a wireless communication destination.

BRIEF DESCRIPTION OF DRAWINGS

FIG. 9 is a flowchart showing IC card access processing using the information processing system 10 according to an embodiment of the present invention.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

The preferred embodiments of the present invention will be described in detail according to the following order.

<1. Embodiments of Present Invention>
[1-1. Configuration of Information Processing System]
[1-2. Configuration of Television Receiver]
[1-3. Configuration of Control Unit included in Television Receiver]
[1-4. Configuration of Remote Controller]
[1-5. Configuration of Control Unit included in Remote Controller]
[1-6. IC Card Access Processing]
<2. Summary>

1. Embodiments of Present Invention

[1.1. Configuration of Information Processing System]

Figure 1:
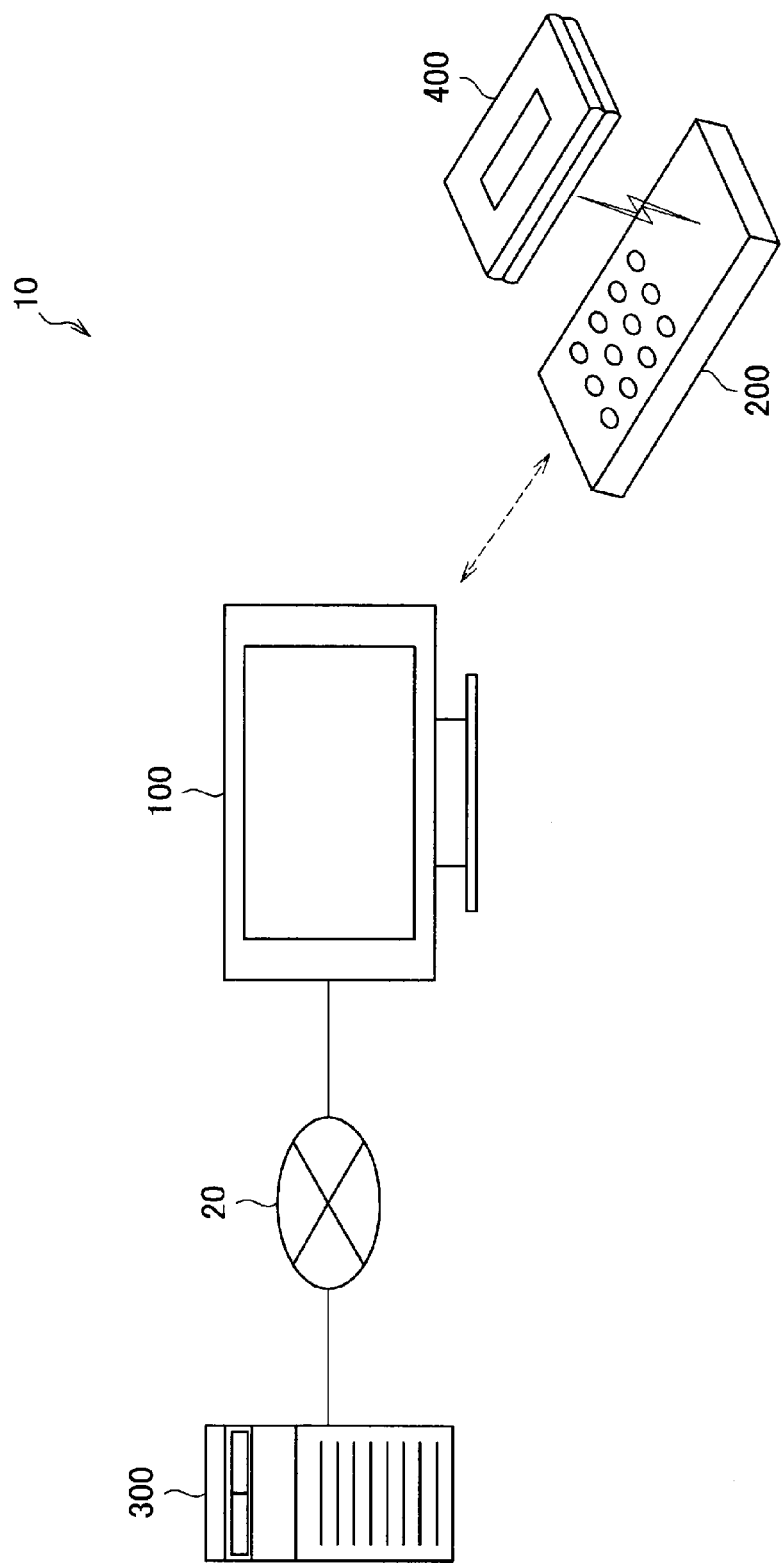
FIG. 1 is an illustrative diagram showing a configuration of an information processing system 10 according to an embodiment of the present invention.

First, the configuration of the information processing system according to an embodiment of the present invention will be described. FIG. 1 is an illustrative diagram showing a configuration of an information processing system 10 according to an embodiment of the present invention. Hereinafter, the configuration of the information processing system 10 according to the embodiment of the present invention will be described using FIG. 1.

As shown in FIG. 1, the information processing system 10 according to the embodiment of the present invention includes a television receiver 100, a remote controller 200, and a server 300.

The television receiver 100 is an example of an information processing device of the present invention. The television receiver 100 receives a broadcast wave and displays a video based on the received broadcast wave on a screen. The television receiver 100 according to this embodiment has a function of establishing a connection to a two-way network 20 such as the Internet, and can transmit/receive data to/from the server 300 via the network 20.

Also, the television receiver 100 executes an operation corresponding to a radio signal from the remote controller 200. The operation corresponding to the radio signal from the remote controller 200 to be executed by the television receiver 100 is, for example, power on/off, switching of broadcast waves (terrestrial analog broadcasting, terrestrial digital broadcasting, BS digital broadcasting, and CS digital broadcasting), switching of reception channels, volume adjustment, display of a menu screen, or the like.

Furthermore, the television receiver 100 has a function of wirelessly sending a response to the remote controller 200 sending the radio signal. The response to the remote controller 200 sending the radio signal is wirelessly sent from the television receiver 100, so that information exchange between the television receiver 100 and the remote controller 200 is possible.

The remote controller 200 is an example of a wireless communication device of the present invention. The remote controller 200 is used to remotely manipulate the television receiver 100. A plurality of buttons for remotely manipulating the television receiver 100 are arranged on one surface of the remote controller 200. The remote controller 200 has a function of wirelessly sending a signal. An operator presses the arranged button, so that a signal corresponding to the pressed button is wirelessly sent from the remote controller 200. The television receiver 100 receives the signal wirelessly sent from the remote controller 200, so that the remote controller 200 can remotely manipulate the television receiver 100.

The remote controller 200 according to this embodiment includes an IC reader/writer for transmitting information to an IC chip capable of contact communication or non-contact communication. In this embodiment, a communication device (for example, an IC card, a mobile phone, or the like) having a built-in IC chip capable of non-contact communication is held over the IC reader/writer, so that the non-contact communication can be performed between the communication device and the remote controller 200. The non-contact communication is performed between the communication device having the built-in IC chip and the remote controller 200, so that communication is possible between the communication device and the television receiver 100 via the remote controller 200. FIG. 1 shows a mobile phone 400 as the communication device having the built-in IC chip capable of non-contact communication. Of course, the communication device having the built-in IC chip capable of contact communication or non-contact communication is not limited to the mobile phone.

The server 300 is connected to the television receiver 100 via the network 20, and can bi-directionally transmit/receive data to/from the television receiver 100. The server 300 according to this embodiment can perform various processing (for example, payment, balance/point balance inquiry, and the like) with the communication device having the built-in IC chip. The server 300 is connected to the television receiver 100 via the network, so that communication between the mobile phone 400 and the server 300 is possible if the mobile phone 400 is held over the IC reader/writer of the remote controller 200. This communication is communication between the mobile phone 400 and the server 300 via the television receiver 100 and the remote controller 200.

The configuration of the information processing system 10 according to the embodiment of the present invention has been described above. Next, a configuration of the television receiver 100 according to an embodiment of the present invention will be described.

[1-2. Configuration of Television Receiver]

Figure 2:
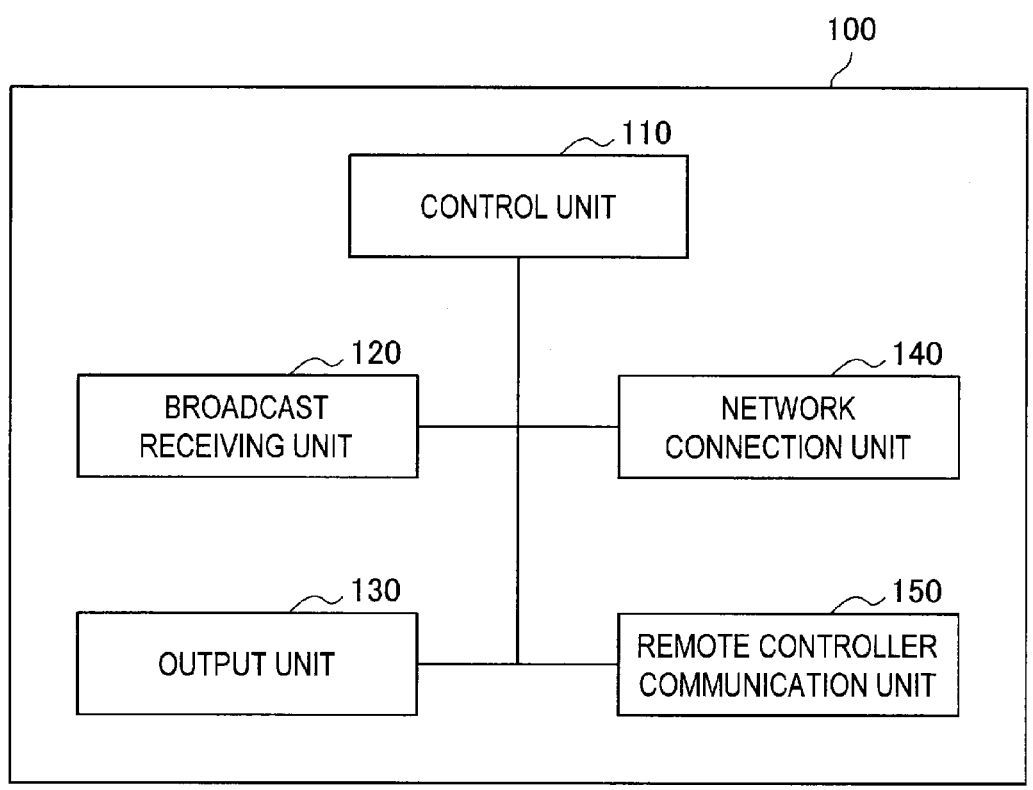
FIG. 2 is an illustrative diagram showing a configuration of a television receiver 100 according to an embodiment of the present invention.

FIG. 2 is an illustrative diagram showing the configuration of the television receiver 100 according to the embodiment of the present invention. Hereinafter, the configuration of the television receiver 100 according to the embodiment of the present invention will be described using FIG. 2.

As shown in FIG. 2, the television receiver 100 according to the embodiment of the present invention includes a control unit 110, a broadcast receiving unit 120, an output unit 130, a network connection unit 140, and a remote controller communication unit 150.

The control unit 110 is used to control each part inside the television receiver 100. For example, a central processing unit (CPU), a micro processing unit (MPU), or the like may be used as the control unit 110.

The broadcast receiving unit 120 executes the reception processing of a broadcast wave transmitted from a broadcasting station. If the television receiver 100 receives the broadcast wave transmitted from the broadcasting station and received by a broadcast wave receiving antenna such as a VHF antenna, a UHF antenna, or a parabolic antenna, the broadcast receiving unit 120 reproduces a video or audio from the received broadcast wave. The broadcast receiving unit 120 may include, for example, a video decoder and/or an audio decoder, which output video data and/or audio data by decoding a video signal and/or an audio signal included in the broadcast wave received by the television receiver 100, an electronic program guide (EPG) decoder, which generates EPG data from EPG information included in the broadcast wave, and the like. The reproduced video and/or audio data and the decoded EPG data is output to the output unit 130 by the broadcast receiving unit 120.

The output unit 130 displays a video or outputs audio on the basis of the video data or audio data reproduced by the broadcast receiving unit 120. The output unit 130 includes a liquid crystal display device, an organic electro-luminescence (EL) display device, or another display for displaying the video and/or a speaker for expressing the audio. Because the television receiver 100 is included as an example of an information processing device of the present invention, the output unit 130 is provided inside the television receiver 100, but, of course, the present invention is not limited to the above-described example.

The network connection unit 140 connected to the network 20 sends data toward the network 20 or receives data sent from the network 20. In this embodiment, data sent from the television receiver 100 to the server 300 is sent from the network connection unit 140, and data sent from the server 300 to the television receiver 100 is received by the network connection unit 140.

The remote controller communication unit 150 wirelessly communicates with the remote controller 200. Upon receipt of a signal wirelessly transmitted from the remote controller 200, the remote controller communication unit 150 transmits the received signal to the control unit 110. The control unit 110 analyzes the signal received by the remote controller communication unit 150, and controls an operation corresponding to the received signal.

If it is necessary to transmit a signal from the television receiver 100 to the remote controller 200, the signal is wirelessly sent from the remote controller communication unit 150 by control of the control unit 110. Communication between the television receiver 100 and the remote controller 200 is possible by radio signal transmission/reception by the remote controller communication unit 150.

The configuration of the television receiver 100 according to the embodiment of the present invention has been described above. Next, a configuration of the control unit 110 included in the television receiver 100 according to an embodiment of the present invention will be described.

Figure 3:
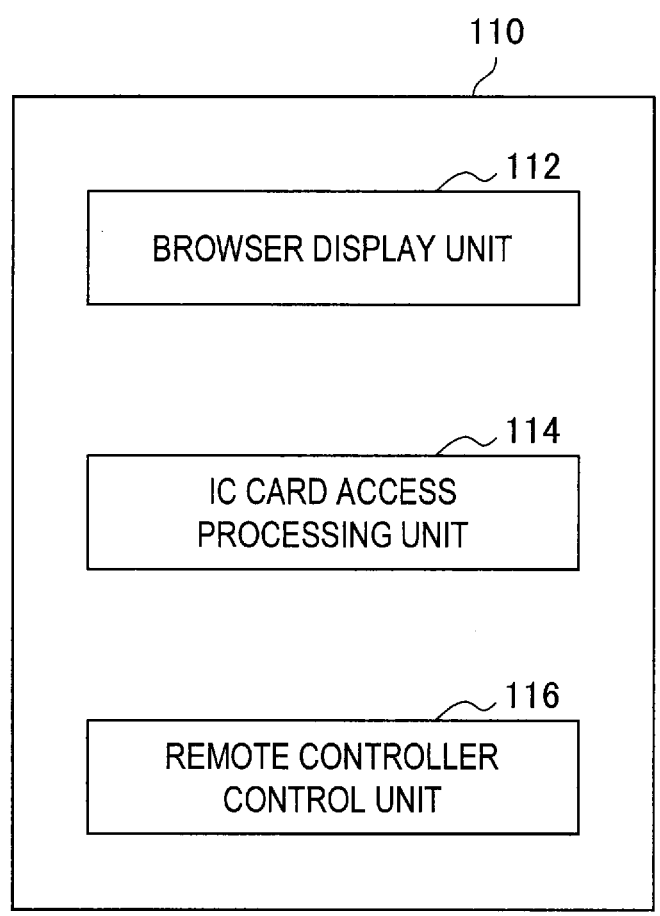
FIG. 3 is an illustrative diagram showing a configuration of a control unit 110 included in the television receiver 100 according to an embodiment of the present invention.

FIG. 3 is an illustrative diagram showing the configuration of the control unit 110 included in the television receiver 100 according to an embodiment of the present invention. Hereinafter, the configuration of the control unit 110 included in the television receiver 100 according to the embodiment of the present invention will be described using FIG. 3.

[1-3. Configuration of Control Unit included in Television Receiver]

As shown in FIG. 3, the control unit 110 according to the embodiment of the present invention includes a browser display unit 112, an IC card access processing unit 114, and a remote controller control unit 116.

The browser display unit 112 controls the output unit 130 to display a browser, and controls the browser displayed on the output unit 130 to display information. The browser display unit 112 has a function of displaying content described in hypertext markup language (HTML) or broadcast markup language (BML) on the output unit 130.

The IC card access processing unit 114 executes the processing for mediating an exchange of information between the server 300 and the IC chip embedded in the mobile phone 400. In the information processing system 10 according to this embodiment, information is not directly exchanged between the server 300 and the IC chip embedded in the mobile phone 400. In the information processing system 10 according to this embodiment, information is exchanged by the IC card access processing unit 114 of which the operation is controlled by the control unit 110 of the television receiver 100.

The IC card access processing unit 114 may be in a state in which the operation of the IC card access processing unit 114 is valid, that is, a state in which the mediation of an information exchange is possible, according to content displayed on the output unit 130 by the browser display unit 112. For example, the content displayed on the output unit 130 by the browser display unit 112 may be a purchase page of goods. In this case, when a user desires to make the payment of goods displayed on the purchase page of goods by the IC chip embedded in the mobile phone 400, the operation of the IC card access processing unit 114 may be valid. Of course, the valid state of the operation of the IC card access processing unit 114 is not limited to the above-described example.

The remote controller control unit 116 analyzes content of a signal wirelessly transmitted from the remote controller 200, and controls an operation of each part of the television receiver 100 according to an analysis result. For example, if the signal wirelessly transmitted from the remote controller 200 is a signal for increasing a volume, the remote controller control unit 116 sends an instruction to the output unit 130 so as to increase the volume to be output from the output unit 130 according to the signal. The output unit 130 receiving the instruction from the remote controller control unit 116 increases the volume of audio to be output from the output unit 130 in response to the instruction.

For example, if the signal wirelessly transmitted from the remote controller 200 is a signal for reporting the start of a reader/writer function of the remote controller 200, the remote controller control unit 116 checks a state of the operation of the IC card access processing unit 114 according to the signal. If the operation of the IC card access processing unit 114 is in the valid state, the remote controller control unit 116 instructs the remote controller communication unit 150 to send a message indicating that the operation of the IC card access processing unit 114 is in the valid state to the remote controller 200 sending the signal.

The configuration of the control unit 110 included in the television receiver 100 according to the embodiment of the present invention has been described above. Next, a configuration of the remote controller 200 according to an embodiment of the present invention will be described.

[1-4. Configuration of Remote Controller]

Figure 4:
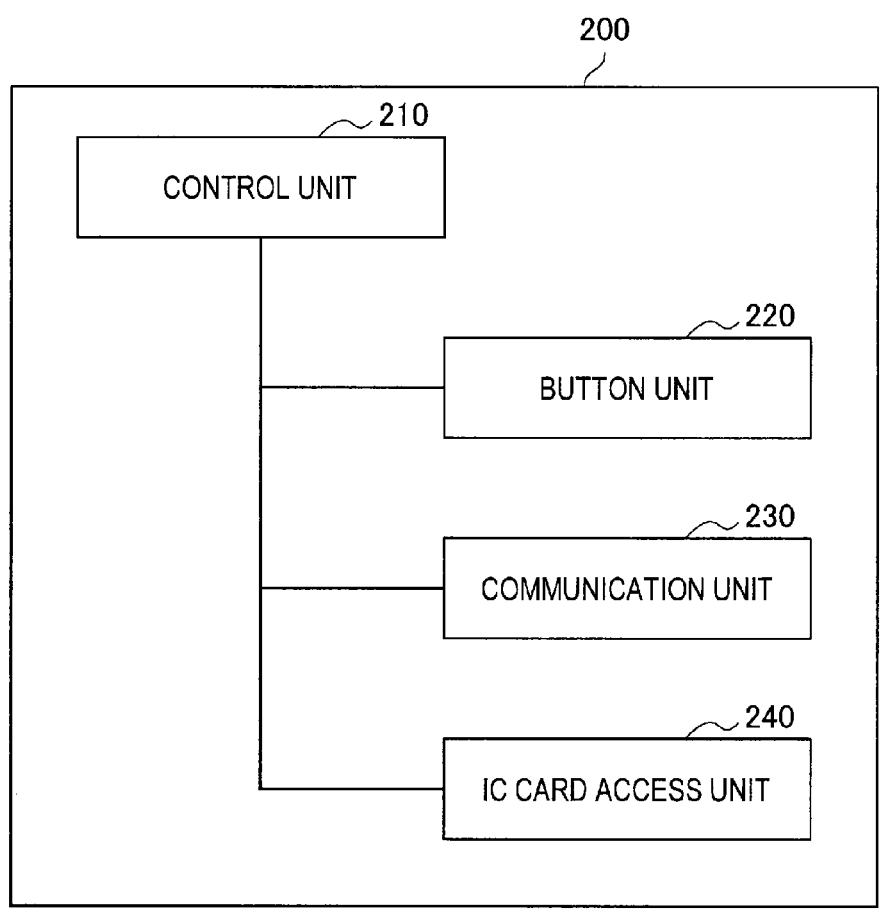
FIG. 4 is an illustrative diagram showing a configuration of a remote controller 200 according to an embodiment of the present invention.

FIG. 4 is an illustrative diagram showing the configuration of the remote controller 200 according to the embodiment of the present invention. Hereinafter, the configuration of the remote controller 200 according to the embodiment of the present invention will be described using FIG. 4.

As shown in FIG. 4, the remote controller 200 according to the embodiment of the present invention includes a control unit 210, a button unit 220, a communication unit 230, and an IC card access unit 240.

The control unit 210 is used to control each part inside the remote controller 200. For example, a CPU, a digital signal processor (DSP), or the like may be used as the control unit 210.

The button unit 220 includes various buttons for remotely manipulating the television receiver 100 or starting the reader/writer function of the remote controller 200. For example, there are a power button for turning on or off a power supply of the television receiver 100, a volume button for adjusting a volume to be output from the television receiver 100, a channel button for selecting a channel to be watched in the television receiver 100, and the like as the buttons for remotely manipulating the television receiver 100. When the user presses each button constituting the button unit 220, the control unit 210 generates a signal corresponding to the pressed button.

The communication unit 230 wirelessly communicates with the television receiver 100. If the user presses the button constituting the button unit 220, the control unit 210 generates a signal corresponding to the pressed button and wirelessly transmits the signal generated by the control unit 210 from the communication unit 230 to the television receiver 100. If a radio signal has been sent from the television receiver 100 to the remote controller 200, the communication unit 230 receives the radio signal and transmits the radio signal to the control unit 210.

The IC card access unit 240 is an example of a terminal communication unit of the present invention. The IC card access unit 240 performs non-contact communication with a terminal (for example, the mobile phone 400) having a built-in IC chip capable of non-contact communication. Although not shown in FIG. 4, the IC card access unit 240 may include, for example, a reader/writer antenna unit for transmitting/receiving data to/from the mobile phone 400, a modulation unit for modulating data to be transmitted to the mobile phone 400, a demodulation unit for demodulating data transmitted from the mobile phone 400, and the like.

Figure 5:
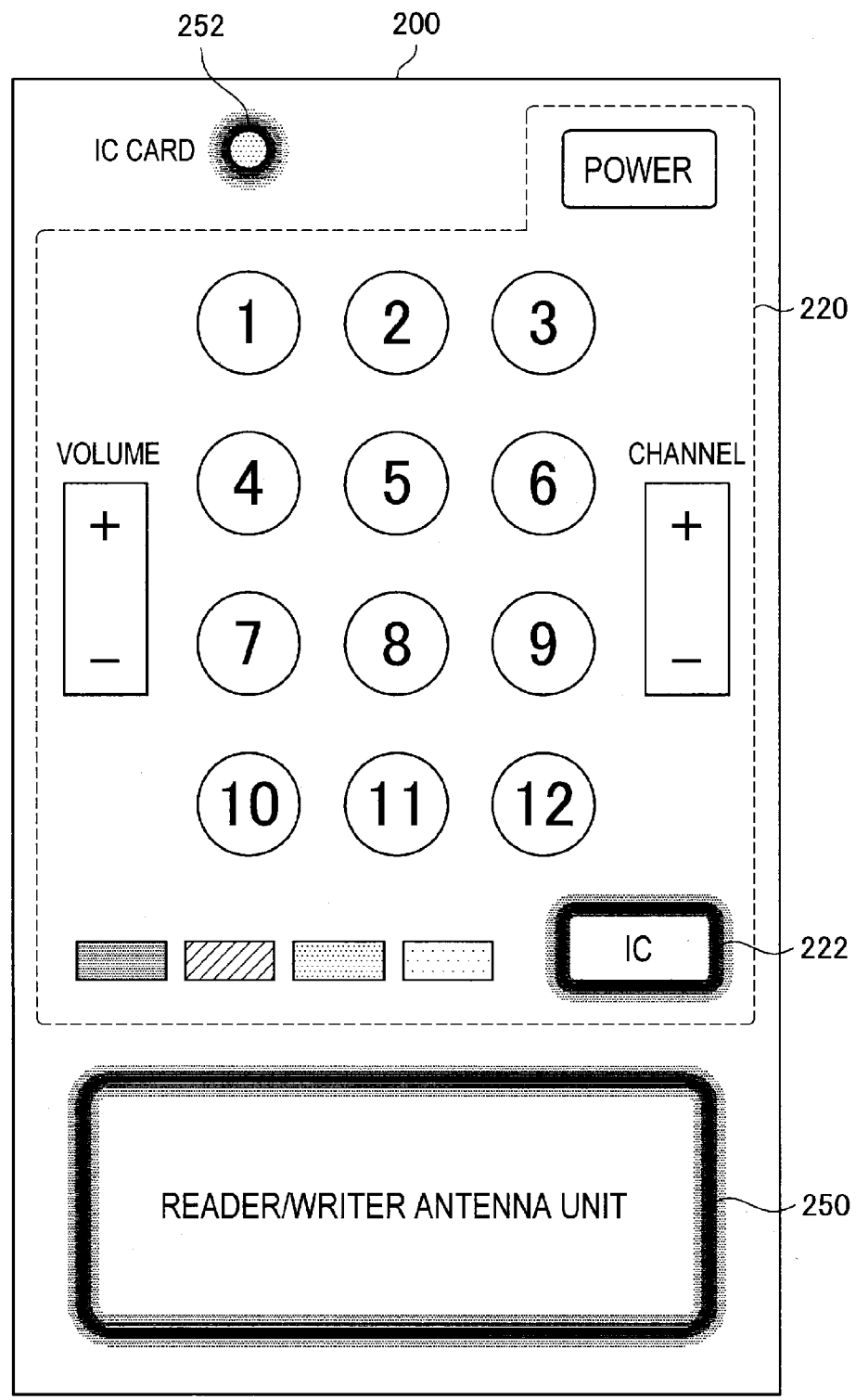
FIG. 5 is an illustrative diagram showing an example of an external appearance of the remote controller 200 according to an embodiment of the present invention.

FIG. 5 is an illustrative diagram showing an example of an external appearance of the remote controller 200 according to an embodiment of the present invention.

In the example shown in FIG. 5, the button unit 220 and a reader/writer antenna unit 250 are provided on one surface of the remote controller 200. An IC card button 222 for causing the reader/writer function of the remote controller 200 to be valid is provided on the button unit 220. In a state in which the user does not press the IC card button 222, the reader/writer function of the remote controller 200 is invalid (that is, the reader/writer antenna unit 250 does not execute a polling operation). Accordingly, even when the mobile phone 400 is held over the reader/writer antenna unit 250 in a state in which the reader/writer function of the remote controller 200 is invalid, it is not possible to perform non-contact communication between the remote controller 200 and the mobile phone 400. If the user presses the IC card button 222, the reader/writer function of the remote controller 200 becomes valid (that is, the reader/writer antenna unit 250 starts the polling operation). If the mobile phone 400 is held over the reader/writer antenna unit 250 in a state in which the reader/writer function of the remote controller 200 is valid, it is possible to perform non-contact communication between the remote controller 200 and the mobile phone 400.

In the example shown in FIG. 5, a light 252 for allowing the state of the reader/writer antenna unit 250 to be recognized is provided on one surface of the remote controller 200. The light 252 may be turned off in a state in which the reader/writer function of the remote controller 200 is invalid, and turned on if the IC card button 222 is pressed. If data is transmitted/received between the IC chip embedded in the mobile phone 400 and the television receiver 100, a lamp may flicker in a predetermined color A or at a predetermined flicker interval B. If data is transmitted/received between the remote controller 200 and the mobile phone 400, it may flicker in a color C different from the above-described color A or at a flicker interval D different from the above-described flicker interval B.

The light 252 is provided on one surface of the remote controller 200 so as to allow the state of the reader/writer antenna unit 250 to be recognized in the example shown in FIG. 5, but, of course, the present invention is not limited to the above-described example. For example, the light may be provided on the IC card button 222 or the light may be provided on the reader/writer antenna unit 250.

Electric power is not supplied from a power supply (for example, a battery) for the remote controller 200 to the IC card access unit 240 until the user presses the IC card button 222. Electric power is supplied to the IC card access unit 240 only when the IC card button 222 is pressed by the user. It is possible to suppress power consumption of the remote controller 200 by supplying the electric power to the IC card access unit 240 only when the IC card button 222 is pressed by the user.

The configuration of the remote controller 200 according to the embodiment of the present invention has been described above. Next, a configuration of the control unit 210 included in the remote controller 200 according to an embodiment of the present invention will be described.

[1-5. Configuration of Control Unit included in Remote Controller]

Figure 6:
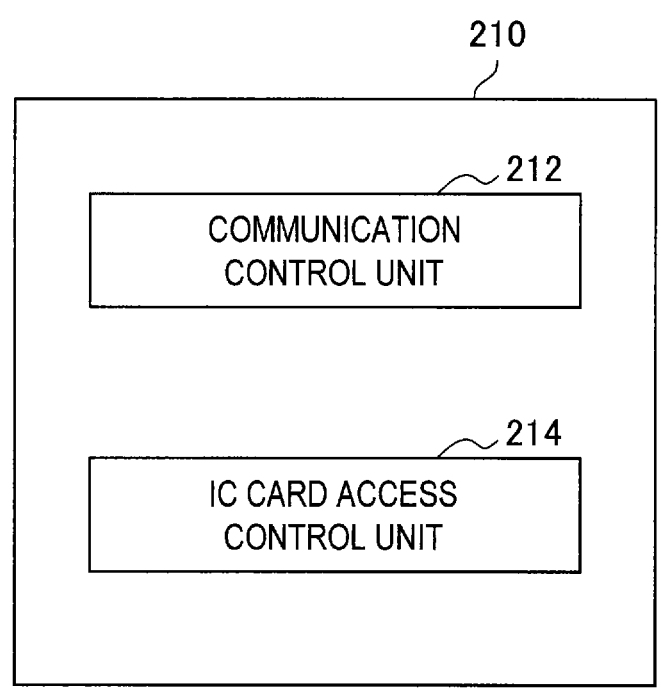
FIG. 6 is an illustrative diagram showing a configuration of a control unit 210 included in the remote controller 200 according to an embodiment of the present invention.

FIG. 6 is an illustrative diagram showing the configuration of the control unit 210 included in the remote controller 200 according to the embodiment of the present invention. Hereinafter, the configuration of the control unit 210 included in the remote controller 200 according to the embodiment of the present invention will be described using FIG. 6.

As shown in FIG. 6, the control unit 210 included in the remote controller 200 according to the embodiment of the present invention includes a communication control unit 212, and an IC card access control unit 214.

The communication control unit 212 is an example of a signal generating unit of the present invention. The communication control unit 212 controls wireless communication from the remote controller 200 to the television receiver 100. For example, if the user presses the button provided on the button unit 220, the communication control unit 212 generates a signal corresponding to the pressed button. The signal generated by the communication control unit 212 is wirelessly transmitted from the communication unit 230 to the television receiver 100. The communication control unit 212 analyzes content of the signal wirelessly transmitted from the television receiver 100 and received by the communication unit 230. The control unit 210 controls the operation of the remote controller 200 according to the content of the signal analyzed by the communication control unit 212.

The IC card access control unit 214 is an example of a terminal communication control unit of the present invention. The IC card access control unit 214 controls the processing of accessing the mobile phone 400 by the IC card access unit 240 (for example, IC card command transmission/reception processing such as reading/writing from/to the IC chip). The control of the access processing by the IC card access control unit 214 enables the remote controller 200 to access the mobile phone 400 when the mobile phone 400 has been held over the reader/writer antenna unit 250 of the remote controller 200.

The configuration of the control unit 210 included in the remote controller 200 according to the embodiment of the present invention has been described above. Next, IC card access processing using the information processing system 10 according to an embodiment of the present invention will be described.

[1.6. IC Card Access Processing]

Figure 7:
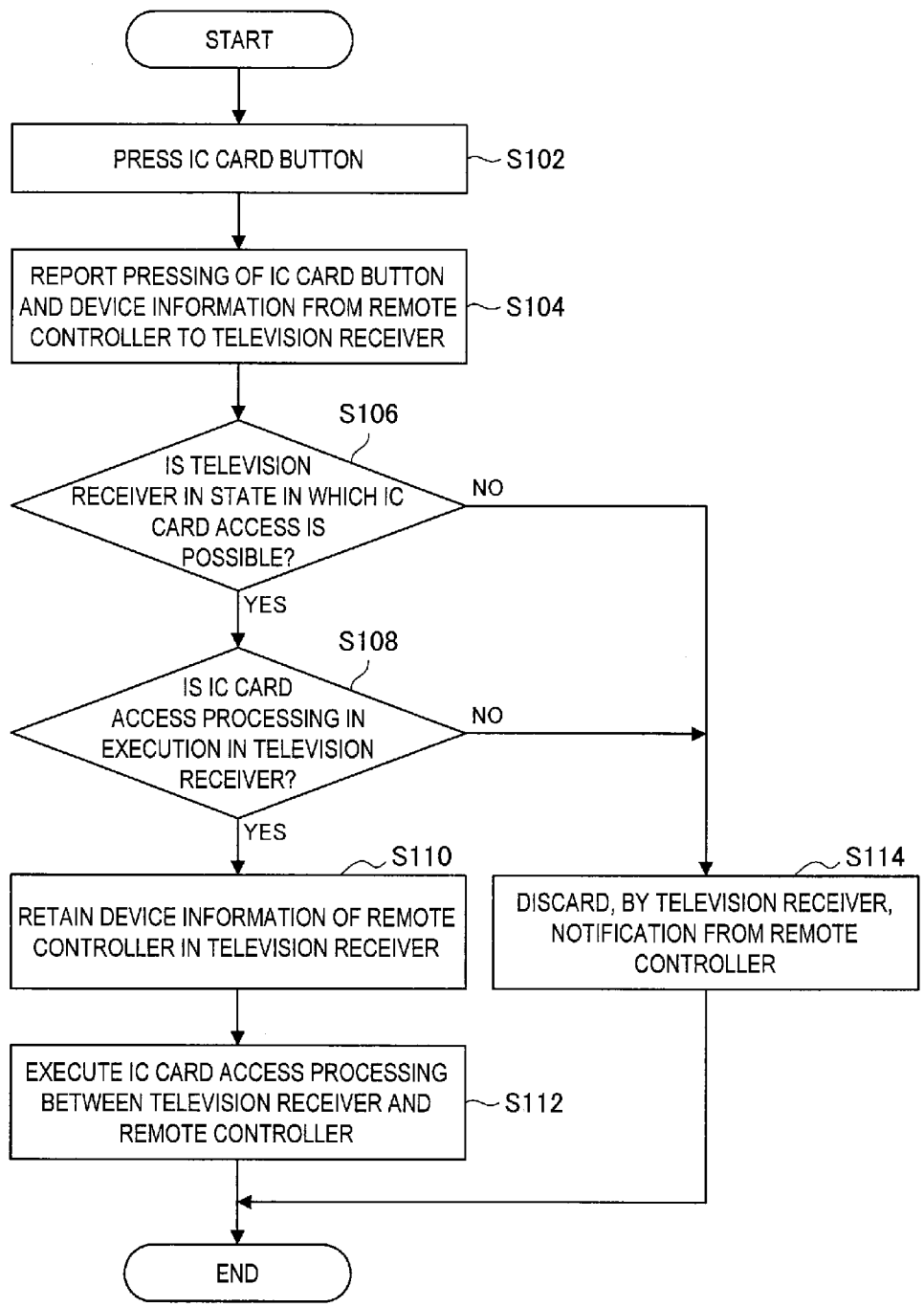
FIG. 7 is a flowchart showing IC card access processing using the information processing system 10 according to an embodiment of the present invention.

FIG. 7 is a flowchart showing the IC card access processing using the information processing system 10 according to the embodiment of the present invention. The "IC card access processing" according to this embodiment is the processing for reading/writing information from/to the IC chip by accessing the IC chip embedded in the mobile phone 400. Hereinafter, the IC card access processing using the information processing system 10 according to the embodiment of the present invention will be described using FIG. 7.

The IC card access processing using the information processing system 10 according to the embodiment of the present invention is started by pressing the IC card button 222 provided on the remote controller 200 (step S102). If the IC card button 222 provided on the remote controller 200 is pressed, the control unit 210 senses the pressing of the IC card button 222 and the communication control unit 212 generates a signal indicating that the IC card button 222 has been pressed. The signal indicating that the IC card button 222 has been pressed generated by the communication unit 212 is wirelessly transmitted from the communication unit 230 to the television receiver 100. In addition to the signal indicating that the IC card button 222 has been pressed, information for identifying the remote controller 200 (for example, device ID information for unique identification) is also wirelessly transmitted from the remote controller 200 to the television receiver 100 (step S104).

In the remote controller 200, the light 252 is turned on so that the user can easily know that the IC card button 222 has been pressed if the IC card button 222 has been pressed. The light 252 may be turned on, for example, by the IC card access control unit 214.

The television receiver 100 receives a signal wirelessly transmitted from the remote controller 200 using the remote controller communication unit 150. If the remote controller communication unit 150 receives the signal from the remote controller 200, the control unit 110 analyzes content of the received signal. If the signal wirelessly transmitted from the remote controller 200 indicates that the IC card button 222 has been pressed and information for identifying the remote controller 200 is included as a result of analysis by the control unit 110, the control unit 110 in the television receiver 100 determines whether or not the operation of the IC card access processing unit 114 is in the valid state (step S106). If the control unit 110 determines that the operation of the IC card access processing unit 114 is in the valid state as a determination result of step S106, the control unit 110 transmits information for identifying the remote controller 200 to the IC card access processing unit 114. Upon receipt of the information for identifying the remote controller 200, the IC card access processing unit 114 retains the information and starts the IC card access processing between the television receiver 100 and the remote controller 200 and transaction control of the IC card access processing.

The IC card access processing between the television receiver 100 and the remote controller 200 is started, for example, by the following procedure. If information for identifying the remote controller 200 is retained, the IC card access processing unit 114 instructs the remote controller control unit 116 to generate a response signal directed to the remote controller 200. The response signal indicates that the IC card access processing is possible. If the remote controller control unit 116 generates the response signal directed to the remote controller 200, the generated response signal is wirelessly transmitted from the remote controller communication unit 150 to the remote controller 200. The remote controller 200 receives the signal transmitted from the television receiver 100, so that the IC card access processing between the television receiver 100 and the remote controller 200 is started.

In the television receiver 100, the IC card access processing unit 114 executes the processing of accessing the mobile phone 400 held over the remote controller 200 by way of the IC card access control unit 214 and the IC card access unit 240 of the remote controller 200 via the remote controller control unit 116. The IC card access processing unit 114 executes processing for content or a program received from the server 300. The IC card access processing unit 114 executes the processing of accessing the mobile phone 400 held over the remote controller 200 by way of the IC card access control unit 214 and the IC card access unit 240 of the remote controller 200 via the remote controller control unit 116.

Incidentally, the number of remote controllers for remotely manipulating the television receiver 100 is not limited to one in the information processing system according to this embodiment. In the information processing system according to this embodiment, the television receiver 100 may be remotely manipulated simultaneously using two or more remote controllers. In this case, if the television receiver 100 is incapable of appropriately determining a remote controller with which access processing should be executed for an IC card, the television receiver 100 may have unintended access to the IC card. Accordingly, the transaction control of the IC card access processing by the IC card access processing unit 114 is important.

If the control unit 110 determines that the operation of the IC card access processing unit 114 is in the valid state as a determination result of step S106 described above, then the control unit 110 determines whether or not the IC card access processing by the IC card access processing unit 114 is already in execution by the television receiver 100 (step S108). It may be determined whether or not the IC card access processing by the IC card access processing unit 114 is already in execution, for example, by whether or not the IC card access processing unit 114 has already retained information for identifying the remote controller 200.

If the control unit 110 determines that the IC card access processing by the IC card access processing unit 114 is not in execution as a determination result of step S108 described above, identification information of the remote controller 200 in which the IC card button 222 has been pressed is retained inside the television receiver (step S110). As described above, the information is retained in the IC card access processing unit 114. If the identification information of the remote controller 200 is retained inside the television receiver 100, IC card access processing between the television receiver 100 and the remote controller 200 and transaction control of the IC card access processing are started (step S112).

On the other hand, if the control unit 110 determines that the operation of the IC card access processing unit 114 is in the valid state as the determination result of step S106 described above, or if the control unit 110 determines that the IC card access processing by the IC card access processing unit 114 is already in execution as the determination result of step S108 described above, the television receiver 100 does not make a response to the remote controller 200 in which the IC card button 222 has been pressed. The television receiver 100 discards the identification information of the remote controller 200 received from the remote controller 200 (step S114). The remote controller 200 in which the IC card button 222 has been pressed awaits the response from the television receiver 100 to arrive for a given period of time. If there is no response from the television receiver 100, the remote controller 200 does not perform the IC card access processing between the television receiver 100 and the remote controller 200 even when the mobile phone 400 is held over.

Figure 8:
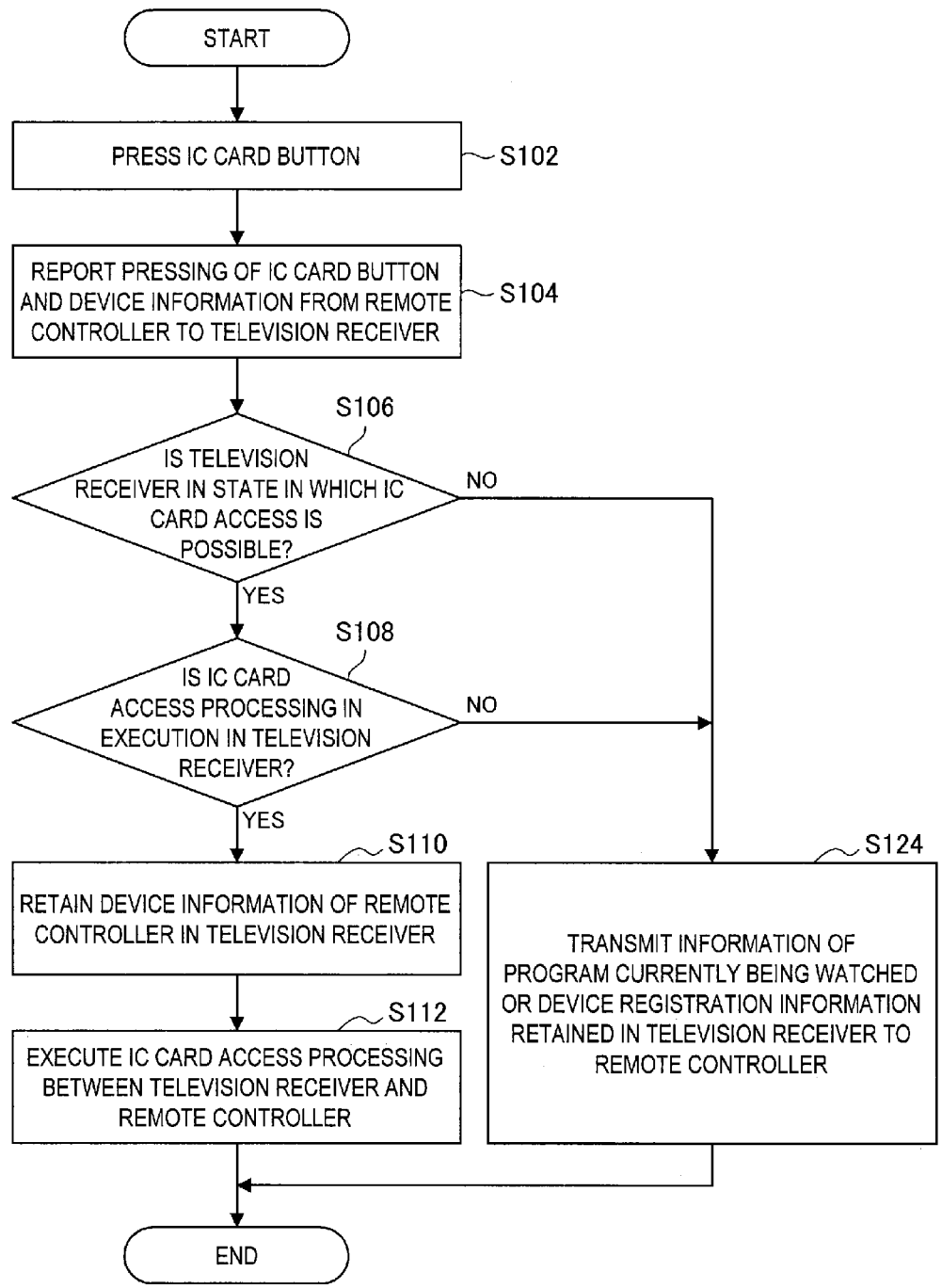
FIG. 8 is a flowchart showing another example of IC card access processing using the information processing system 10 according to an embodiment of the present invention.

The television receiver 100 discards the received identification information of the remote controller 200 in step S114 described above in the IC card access processing using the information processing system 10 according to the embodiment of the present invention shown in FIG. 7, but the present invention is not limited to the above-described example. FIG. 8 is a flowchart showing another example of the IC card access processing using the information processing system 10 according to the embodiment of the present invention shown in FIG. 7.

The processing of step S114 shown in FIG. 7 is changed in FIG. 8, and the processing of transmitting information of a program currently being watched, which is retained in the television receiver 100, or device registration information registered in the television receiver 100 from the television receiver 100 to the remote controller 200 is performed (step S124). For example, there is channel information or time information as the information of the program currently being watched. Also, there is a zip code or present location information registered by the user in the television receiver 100 as the device registration information registered in the television receiver 100. The television receiver 100 may transmit information for a connection to the Internet such as proper URL information as well as program information to the remote controller 200. If a global positioning system (GPS) function is embedded in the television receiver 100, the present location information included as the example of the above-described device registration information may be acquired using the GPS function.

If the remote controller 200 receives the information transmitted from the television receiver 100 in step S124 described above, the remote controller 200 can transmit the received information to the mobile phone 400 held over the reader/writer antenna unit 250.

FIG. 9 is a flowchart showing IC card access processing using the information processing system 10 according to the embodiment of the present invention if a start request for the IC card access processing from a plurality of remote controllers 200 to the television receiver 100 is made.

Because steps S102 and S104 of FIG. 9 are the same processing as those of the flowcharts shown in FIGS. 7 and 8, detailed description is omitted. If the IC card button 222 is pressed and a signal is wirelessly transmitted from the remote controller 200 to the television receiver 100, the control unit 110 determines whether or not IC card access processing of the television receiver 100 corresponding to the pressing of the IC card button 222 has been started (step S132). If it is determined that the IC card access processing has been started as a determination result of step S132, the IC card access processing is executed between the television receiver 100 and the remote controller 200 (step S134). When the IC card access processing is started, the operation of the IC card access processing unit 114 is in the valid state and there is no other remote controller that executes the IC card access processing.

On the other hand, if it is determined that the IC card access processing of the television receiver 100 corresponding to the pressing of the IC card button 222 has not been started as the determination result of step S132 described above, the control unit 210 of the remote controller 200 subsequently determines whether or not there has been a response from the television receiver 100 to the remote controller 200 (step S136). If it is determined that there has been the response from the television receiver 100 as a determination result of step S134, information received from the television receiver 100 is transmitted from the remote controller 200 to the mobile phone 400 held over the reader/writer antenna unit 250 in conjunction with information retained in the remote controller 200 (step S138). On the other hand, if there has been no response from the television receiver 100 as the determination result of step S134, only the information retained in the remote controller 200 is transmitted from the remote controller 200 to the mobile phone 400 held over the reader/writer antenna unit 250 (step S140).

As described above, if the IC card access processing corresponding to the pressing of the IC card button 222 has not been started in the television receiver 100 even when the IC card button 222 of the remote controller 200 has been pressed, the remote controller 200 changes information to be transmitted to the mobile phone 400 by the presence/absence of a response from the television receiver 100. Here, when the IC card access processing corresponding to the pressing of the IC card button 222 has not been started in the television receiver 100, the IC card access processing is already in execution with another remote controller, or the like. The mobile phone 400 can execute subsequent processing (for example, access to the Internet or the like) using information transmitted from the remote controller 200.

Next, manipulation control of the remote controller 200 during the IC card access processing in the information processing system 10 according to an embodiment of the present invention will be described. When the IC card button 222 has been pressed and the IC card access processing for the mobile phone 400 held over the reader/writer antenna unit 250 has been executed, there is a problem in that the IC card access processing is interrupted if the user manipulates the button unit 220 of the remote controller 200. For example, if the user erroneously presses a power button provided on the button unit 220 of the remote controller 200, the power supply of the television receiver 100 is turned off and the IC card access processing is interrupted. Thus, it is preferable to limit a function that affects IC card access processing during execution of the IC card access processing even when the button unit 220 of the remote controller 200 is manipulated.

For example, when the IC card access processing has been executed between the television receiver 100 and the remote controller 200, the button unit 220 of the remote controller 200 may be manipulated by the user and a signal corresponding to a manipulated button may be transmitted from the remote controller 200 to the television receiver 100. In this case, even when the television receiver 100 receives the signal wirelessly transmitted from the remote controller 200, the television receiver 100 discards the received signal. For example, when the IC card access processing has been executed between the television receiver 100 and the remote controller 200, a signal may be wirelessly transmitted to the television receiver 100 on the basis of the manipulation of the button unit 220 from another remote controller 200. Likewise, in this case, even when the television receiver 100 receives the signal wirelessly transmitted from another remote controller 200 that does not execute the IC card access processing with the television receiver 100, the television receiver 100 discards the received signal. The television receiver 100 discards the received signal as described above, so that the IC card access processing is not affected even when the button unit 220 of the remote controller 200 has been manipulated by the user when the IC card access processing has been executed between the television receiver 100 and the remote controller 200.

When a button for releasing the IC card access processing has been pressed in the remote controller 200 in the case where the IC card access processing has been executed between the television receiver 100 and the remote controller 200, the television receiver 100 may stop the IC card access processing on the basis of a signal wirelessly transmitted from the remote controller 200 according to the pressing. The button for releasing the IC card access processing may be the IC card button 222 or a button different from the IC card button 222. For example, the button for releasing the IC card access processing may be defined for a plurality of buttons. For example, if only the power off is defined to be accepted during the IC card access processing, the power button may be defined as the button for releasing the IC card access processing.

The signal transmitted from the remote controller 200 is discarded in the television receiver 100 when the button unit 220 of the remote controller 200 has been manipulated in the case where the IC card access processing has been executed between the television receiver 100 and the remote controller 200 as described above, but the present invent is not limited to the above-described example. Signal generation of the remote controller 200 may be limited when the button unit 220 of the remote controller 200 has been manipulated in the case where the IC card access processing has been executed between the television receiver 100 and the remote controller 200. For example, even when a button other than the button for releasing the IC card access processing is pressed, the control unit 210 may make a limitation so that a signal corresponding to the pressing of the button is not generated. When a button that does not affect the IC card access processing has been pressed in the remote controller 200 in the case where the IC card access processing has been executed between the television receiver 100 and the remote controller 200, a signal may be generated on the pressing of the button. The button that does not affect the IC card access processing may be, for example, the volume adjustment button. When the button that does not affect the IC card access processing has been pressed in another remote controller 200 that has not executed the IC card access processing in the case where the IC card access processing has been executed between the television receiver 100 and the remote controller 200, another remote controller 200 may generate a signal on the basis of the pressing of the button.

The manipulation control of the remote controller 200 during the IC card access processing in the information processing system 10 according to the embodiment of the present invention has been described above.

2. Summary

According to the embodiment of the present invention as described above, electric power is supplied to the IC card access unit 240 only if the IC card button 222 of the remote controller 200 has been pressed by the user. It is possible to suppress power consumption of the remote controller 200 by supplying the electric power to the IC card access unit 240 only by the pressing of the IC card button 222.

According to the embodiment of the present invention, the television receiver 100 senses that the IC card button 222 of the remote controller 200 has been pressed. If the television receiver 100 is in a state in which the IC card access processing is possible with the remote controller 200 in which the IC card button 222 has been pressed, the IC card access processing is started between the television receiver 100 and the remote controller 200. As described above, the television receiver 100 can access the mobile phone 400 held over the reader/writer antenna unit 250 of the remote controller 200 by starting the IC card access processing between the television receiver 100 and the remote controller 200.

According to the embodiment of the present invention, even when the IC card button 222 of another remote controller 200 is pressed, if the television receiver 100 has already executed the IC card access processing with another remote controller, the IC card access processing is not executed with the remote controller 200. It is possible to execute one-to-one IC card access processing even when there are a plurality of remote controllers for the television receiver 100 by limiting the IC card access processing.

According to the embodiment of the present invention, if the television receiver 100 is incapable of starting the IC card access processing with the remote controller 200 even when the IC card button 222 of the remote controller 200 is pressed, information is transmitted from the remote controller 200 to the mobile phone 400 held over the reader/writer antenna unit 250. For example, it is possible to transmit information of the remote controller 200, or information received from the television receiver 100, from the remote controller 200 to the mobile phone 400. In the mobile phone 400, processing is possible using received information by transmitting the information to the mobile phone 400 as described above.

According to the embodiment of the present invention, the IC card access processing is possible only when the IC card button 222 of the remote controller 200 is pressed. Accordingly, it is possible to limit unintended access of the user to the mobile phone 400.

The IC card access processing using the above-described information processing system 10 may be performed by hardware or software. If the processing is performed by software, a computer program may be stored inside the television receiver 100 or the remote controller 200, and the control units 110 and 210 may read and sequentially execute the stored computer program.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

REFERENCE SIGNS LIST

10 Information processing system
100 Television receiver
110 Control unit
112 Browser display unit
114 IC card access processing unit
116 Remote controller control unit
120 Broadcast receiving unit
130 Output unit
140 Network connection unit
150 Remote controller communication unit
200 Remote controller
210 Control unit
212 Communication control unit
214 IC card access control unit
220 Button unit
222 IC card button
230 Communication unit
240 IC card access unit
250 Reader/writer antenna unit
252 Light
300 Server
400 Mobile phone

The invention claimed is:

1. A wireless communication device comprising:
a manipulation unit including a terminal communication transition unit for sending a transition instruction for transitioning to a state in which communication with a communication terminal that performs contact communication or non-contact communication is possible;
a terminal communication unit that transitions to a state in which the contact communication or the non-contact communication with the communication terminal is possible in response to the transition instruction sent by the terminal communication transition unit;
a signal generating unit for generating a signal corresponding to a manipulation of the manipulation unit including a transition instruction signal corresponding to the transition instruction;
a transmission unit for wirelessly transmitting the transition instruction signal generated by the signal generating unit to an information processing device;
a reception unit for wirelessly receiving a response from the information processing device to the transition instruction signal transmitted from the transmission unit; and
a terminal communication control unit for starting to control information transmission/reception between the communication terminal and the information processing device only when predetermined conditions are satisfied, in which the predetermined conditions include if the response received by the reception unit indicates that the information processing device is in a state in which information transmission/reception to/from the communication terminal is possible and there is no other communication terminal that transmits/receives information,
in which the information processing device is a television receiver, and
in which when the predetermined conditions are satisfied information transmission/reception between the communication terminal and the television receiver are enabled by way of the wireless communication device such that information transmission/reception is not enabled directly between the communication terminal and the television receiver.

2. The wireless communication device according to claim 1, wherein the signal generating unit limits signal generation when the manipulation unit is manipulated if information is transmitted/received between the communication terminal and the information processing device.

3. The wireless communication device according to claim 2, wherein, if the manipulation unit is manipulated for a manipulation that does not affect the contact communication or the non-contact communication between the terminal communication unit and the communication terminal, the signal generating unit generates a signal corresponding to the manipulation.

4. The wireless communication device according to claim 1, wherein the terminal communication control unit controls the terminal communication unit to transmit information unique to the wireless communication device to the communication terminal when sensing that the information processing device is not in the state in which the information transmission/reception to/from the communication terminal is possible.

5. The wireless communication device according to claim 1, wherein the terminal communication control unit controls the terminal communication unit to transmit information unique to the wireless communication device and information regarding an operation situation of the information processing device to the communication terminal if the response received by the reception unit indicates that the information processing device is in the state in which the information transmission/reception to/from the communication terminal is possible, but there is another communication terminal that transmits/receives information.

6. A wireless communication device comprising:
a manipulation unit including a terminal communication transition unit for sending a transition instruction for transitioning to a state in which communication with a communication terminal that performs contact communication or non-contact communication is possible;
a terminal communication unit that transitions to a state in which the contact communication or the non-contact communication with the communication terminal is possible in response to the transition instruction sent by the terminal communication transition unit;
a signal generating unit for generating a signal corresponding to a manipulation of the manipulation unit including a transition instruction signal corresponding to the transition instruction;
a transmission unit for wirelessly transmitting the transition instruction signal generated by the signal generating unit to an information processing device;
a reception unit for wirelessly receiving a response from the information processing device to the transition instruction signal transmitted from the transmission unit; and a terminal communication control unit for starting to control information transmission/reception between the communication terminal and the information processing device only if the response received by the reception unit indicates that the information processing device is in a state in which information transmission/reception to/from the communication terminal is possible and there is no other communication terminal that transmits/receives information, wherein the terminal communication control unit controls the terminal communication unit to transmit information unique to the wireless communication device and information regarding an operation situation of the information processing device to the communication terminal if the response received by the reception unit indicates that the information processing device is in the state in which the information transmission/reception to/from the communication terminal is possible, but there is another communication terminal that transmits/receives information, and wherein the information regarding the operation situation is information regarding a program being watched.

7. The wireless communication device according to claim 5, wherein, if the manipulation unit is manipulated for a manipulation that does not affect the contact communication or the non-contact communication between the terminal communication unit and the communication terminal, the signal generating unit generates a signal corresponding to the manipulation.

8. An information processing device comprising:
a reception unit for receiving a signal wirelessly transmitted from a wireless terminal;
a signal analyzing unit for analyzing whether or not a transition instruction for transitioning to a state in which communication from the wireless terminal to a communication terminal that performs contact communication or non-contact communication is possible is included in the signal received by the reception unit; and
a response generating unit for generating a response to the transition instruction when communication processing for the communication terminal is possible and there is no other communication terminal that transmits/receives information if the transition instruction is included as an analysis result of the signal analyzing unit,
in which the information processing device is a television receiver.

9. A wireless communication method for use by a wireless communication device, said method comprising:
a sending step of sending a transition instruction for transitioning to a state in which communication with a communication terminal that performs contact communication or non-contact communication is possible;
a transition step of transitioning to a state in which the contact communication or the non-contact communication with the communication terminal is possible by the transition instruction sent in the sending step;
a signal generating step of generating a transition instruction signal corresponding to the transition instruction;
a transmission step of wirelessly transmitting the transition instruction signal generated in the signal generating step to an information processing device;
a reception step of wirelessly receiving a response from the information processing device to the transition instruction signal transmitted in the transmission step; and
a control step of starting to control information transmission/reception between the communication terminal and the information processing device only when predetermined conditions are satisfied, in which the predetermined conditions include if the response received in the reception step indicates that the information processing device is in a state in which information transmission/reception to/from the communication terminal is possible and there is no other communication terminal that transmits/receives information,
in which the information processing device is a television receiver, and
in which when the predetermined conditions are satisfied information transmission/reception between the communication terminal and the television receiver are enabled by way of the wireless communication device such that information transmission/reception is not enabled directly between the communication terminal and the television receiver.

10. An information processing system comprising:
a wireless communication device for wirelessly transmitting/receiving a signal; and
an information processing device for wirelessly transmitting/receiving a signal to/from the wireless communication device,
wherein the wireless communication device includes:
a manipulation unit including a terminal communication transition unit for sending a transition instruction for transitioning to a state in which communication with a communication terminal that performs contact communication or non-contact communication is possible;
a terminal communication unit that transitions to a state in which the contact communication or the non-contact communication with the communication terminal is possible in response to the transition instruction sent by the terminal communication transition unit;
a signal generating unit for generating a signal corresponding to a manipulation of the manipulation unit including a transition instruction signal corresponding to the transition instruction;
a transmission unit for wirelessly transmitting the transition instruction signal generated by the signal generating unit to the information processing device;
a reception unit for wirelessly receiving a response from the information processing device to the transition instruction signal transmitted from the transmission unit; and
a terminal communication control unit for starting to control information transmission/reception between the communication terminal and the information processing device only when predetermined conditions are satisfied, in which the predetermined conditions include if the response received by the reception unit indicates that the information processing device is in a state in which information transmission/reception to/from the communication terminal is possible and there is no other communication terminal that transmits/receives information, and
the information processing device includes:
a reception unit for receiving a signal wirelessly transmitted from a wireless terminal;
a signal analyzing unit for analyzing whether or not a transition instruction for transitioning to a state in which communication from the wireless terminal to a communication terminal that performs the contact communication or the non-contact communication is possible is included in the signal received by the reception unit; and
a response generating unit for generating a response to the transition instruction when communication processing for the communication terminal is possible and there is no other communication terminal that transmits/receives information if the transition instruction is included as an analysis result of the signal analyzing unit, in which the information processing device is a television receiver, and in which when the predetermined conditions are satisfied information transmission/reception between the communication terminal and the television receiver are enabled by way of the wireless communication device such that information transmission/reception is not enabled directly between the communication terminal and the television receiver.

* * * * *